(12) United States Patent
Kadoche

(10) Patent No.: US 6,347,515 B1
(45) Date of Patent: Feb. 19, 2002

(54) HYDRAULIC LIFT ACTUATING DEVICE

(75) Inventor: Emile Kadoche, Villiers Saint Frederic (FR)

(73) Assignee: Hydraulic Inventions BV, Amsterdam (NL)

(*) Notice: Subject to any disclaimer, the term of this patent is extended or adjusted under 35 U.S.C. 154(b) by 0 days.

(21) Appl. No.: 09/582,470

(22) PCT Filed: Dec. 23, 1998

(86) PCT No.: PCT/FR98/02845

§ 371 Date: Jun. 26, 2000

§ 102(e) Date: Jun. 26, 2000

(87) PCT Pub. No.: WO99/33740

PCT Pub. Date: Jul. 8, 1999

(30) Foreign Application Priority Data

Dec. 29, 1997 (FR) ............................................. 97 16609
Aug. 11, 1998 (FR) ............................................. 98 10285

(51) Int. Cl.$^7$ ............................................. F16D 31/02
(52) U.S. Cl. ............................ 60/372; 60/414; 60/478
(58) Field of Search ........................... 60/428, 372, 371, 60/414

(56) References Cited

U.S. PATENT DOCUMENTS

| 4,188,787 A | * 2/1980 | Bromell et al. ............... 60/327 |
| 4,761,953 A | 8/1988 | Rosman |

FOREIGN PATENT DOCUMENTS

| WO | 9405583 | 3/1994 |
| WO | 9427905 | 12/1994 |

* cited by examiner

*Primary Examiner*—Edward K. Look
*Assistant Examiner*—Michael Leslie
(74) *Attorney, Agent, or Firm*—Ostrolenk, Faber, Gerb & Soffen, LLP

(57) ABSTRACT

The invention relates to a drive device for a hydraulic elevator, the device comprising an actuator (1) whose pressure chamber (1a) is connected to a pump (11) via a down duct (15) and via an up duct (16). A pressure accumulator (4) is connected to the down and up ducts (15, 16) via parallel ducts (15a, 16a), each duct having an electrically controlled valve (2, 2a; 6, 6a). While the elevator is moving downwards, hydraulic fluid is transferred from the pressure chamber (1a) to the accumulator (4) via the down duct (15) and the parallel duct (16a). While the elevator is moving upwards, hydraulic fluid is transferred from the accumulator (4) to the pressure chamber (1a).

8 Claims, 5 Drawing Sheets

HYDRAULIC LIFT ACTUATING DEVICE

The present invention relates to a method of driving an elevator or other like installation.

More precisely, the invention relates to means enabling the up and down movement of the elevator or the like to be controlled.

In the present patent application, the term "elevator or the like" covers all kinds of platform or cage known as elevators, lifts, hoists, etc. for moving goods or people between levels, including those designed specifically for the handicapped.

The present invention serves mainly to reduce energy consumption, which is important for the user since it requires less energy on each start, and thus an electrical installation that is smaller. This important detail is but one of the aspects of the invention developed below.

As is well known, there are two large families of drive device for controlling the up and down movements of an elevator, said devices being either electrical or hydraulic. The present invention relates solely to the field of elevators that are controlled in hydraulic manner. Naturally, hydraulic control covers means fed with any liquid, not necessarily water.

Conventionally, in hydraulic type elevator drive systems, there is an actuator whose stroke serves to move the cage, and to do so over an amplitude that is naturally equal to the height of the shaft.

For example, it is easily understood that in order to carry eight people, a 630 kg apparatus is required, and that is the type of apparatus that is the most widespread throughout the world, covering 80% of the market. The dead weight of the structure for an 630 kg cage is approximately equal to the payload, depending on manufacturer, giving a total of about 1260 kg to be moved.

In the two modes mentioned above, energy requirements on starting, and throughout all displacement stages, whether at high speed or at low speed or at approach speed, are large. Heretofore, no energy recovery means has been implemented, and indeed it is clear that the size of the energy consumption bill paid by the user is of little concern to the manufacturer.

Another non-negligible negative feature of known hydraulic systems, and one that is perceived by all users, is the waiting time after the gate of the cage has been closed, given that the elevator remains stationary for a few seconds for the simple reason that the pump cannot start directly delivering the power required, and the drive motor needs to start progressively via a star-delta coupling, and only subsequently put the hydraulic circuit under pressure. It should be observed that this stage is repeated on each upward start of the apparatus.

Existing hydraulic apparatuses enable the user to travel down with the apparatus even in the event of a power failure, which is naturally highly advantageous and very reassuring. The present invention provides a considerable improvement to this advantage.

To achieve this end, the present invention thus provides implementing an energy recovery device and making a fundamental modification to the hydraulic circuit used in the known system.

The invention relates to a drive device for a hydraulic type elevator, the device comprising an actuator cylinder in which a piston is slidably mounted and having a pressure chamber connected via a hydraulic circuit to a pump driven by a motor and connected to a source of fluid.

According to the invention, the device is characterized by the fact that the fluid source is constituted by a pressure accumulator, and by the fact that the hydraulic circuit comprises:

a down duct connecting the pressure chamber to the inlet of the pump and in which there are connected in series a first electrically controlled valve and a first check valve;

an up duct connecting the outlet of the pump to the pressure chamber, and in which there are connected in series a second electrically controlled valve and a second check valve;

a first parallel duct connecting the pressure accumulator to the down duct at a point situated between the first check valve and the inlet to the pump, and in which a third electrically controlled valve is connected; and a second parallel duct connecting the pressure accumulator to the up duct at a point situated between the second electrically controlled valve and the outlet from the pump, and in which a fourth electrically controlled valve is connected;

by the fact that the first electrically controlled valve and the third electrically controlled valve are open while the elevator is moving downwards, the second electrically controlled valve and the fourth electrically controlled valve then being closed; and by the fact that the second electrically controlled valve and the fourth electrically controlled valve are open while the elevator is moving upwards, the first electrically controlled valve and the third electrically controlled valve then being closed.

Other characteristics and advantages of the invention will appear better on reading the following description of various embodiments of the invention given as non-limiting examples and with reference to the accompanying drawings, in which.

Figure 1:
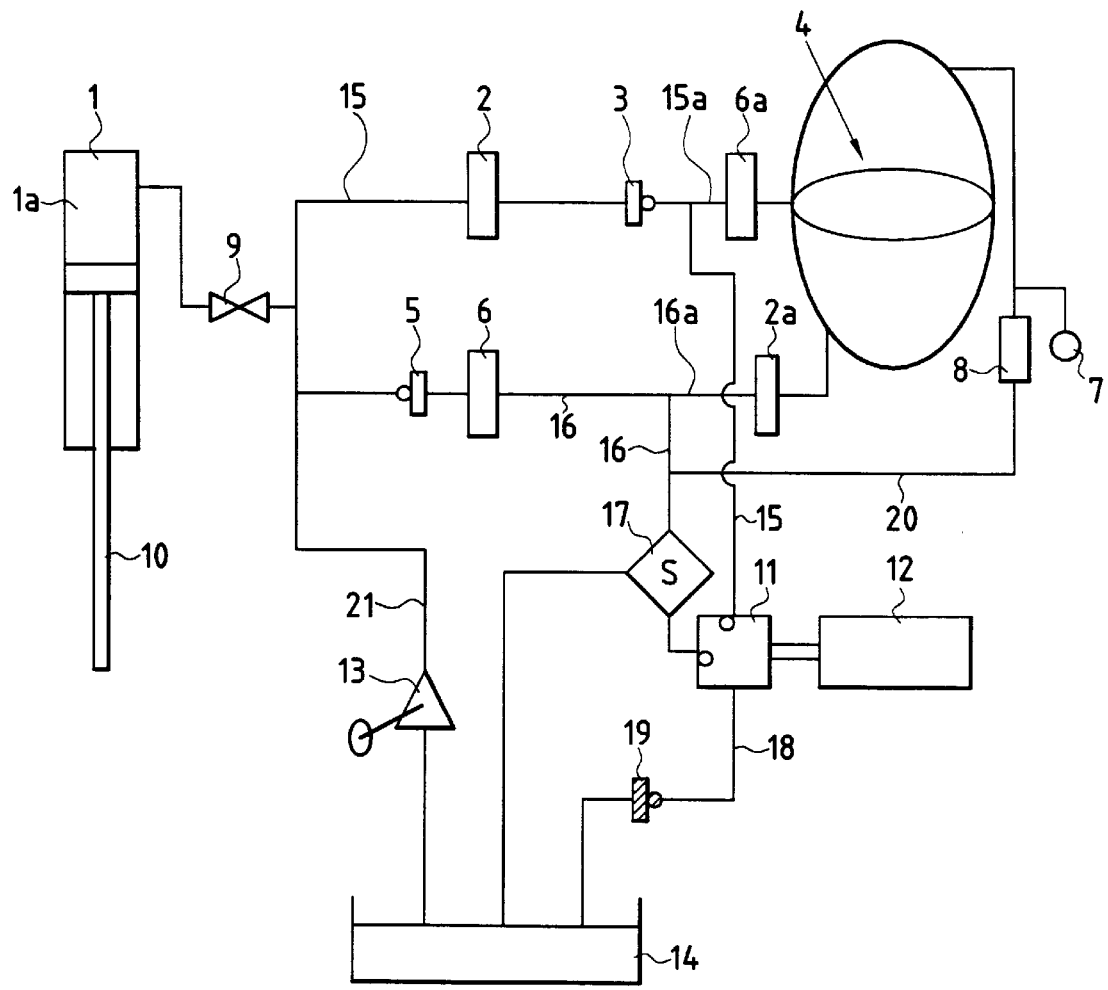
FIG. 1 is a diagrammatic and simplified view of the hydraulic circuit controlling the displacement actuator of an elevator constituting a first embodiment.
Figure 2:
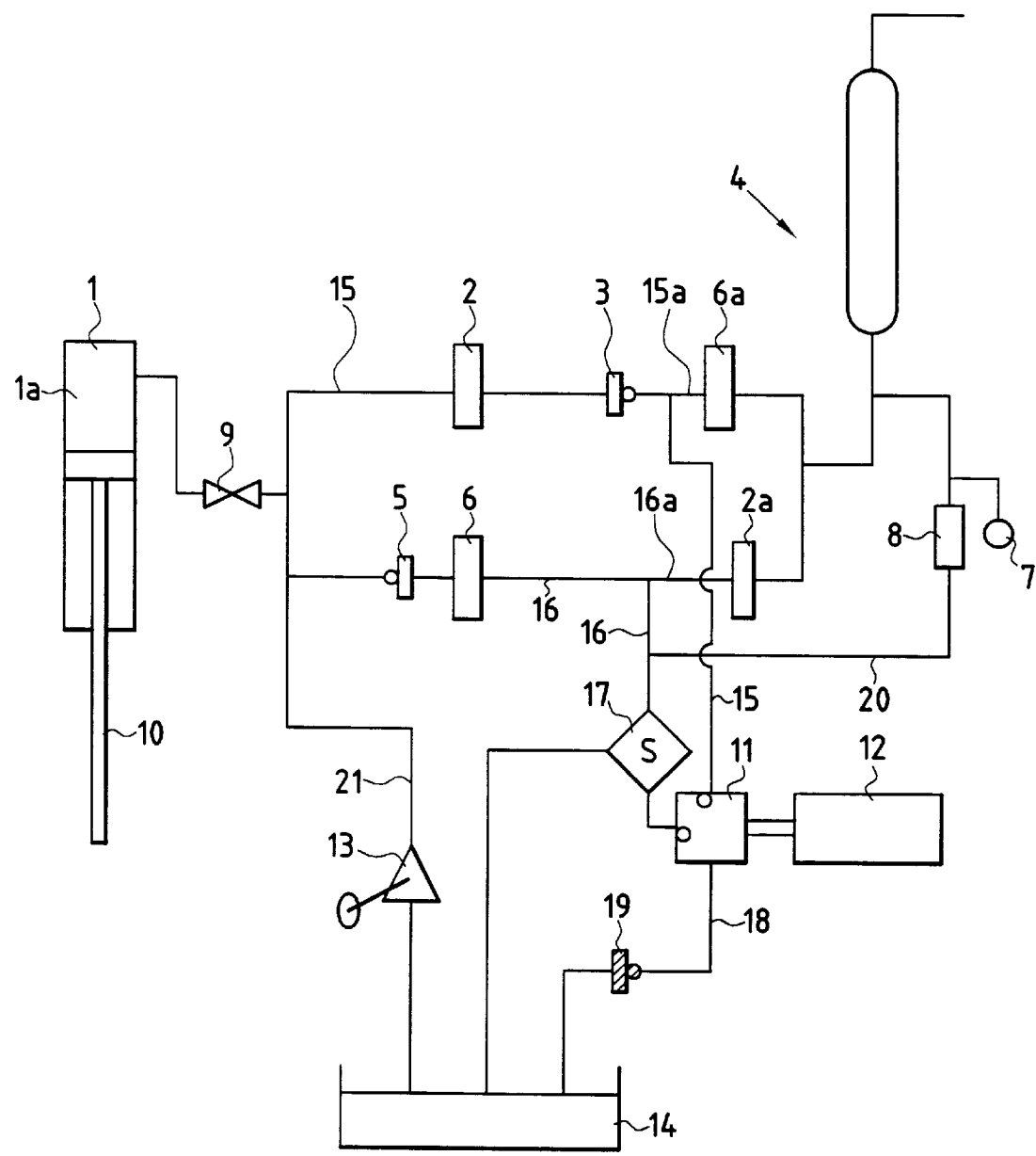
FIG. 2 is a diagram showing a variant of the same hydraulic circuit.

In the drawings, reference 1 designates the cylinder of the actuator which has a piston 10 slidably mounted therein fitted with a piston rod and having a pressure chamber 1a connected to a closure valve 9.

The inlet of the closure valve 9 is connected to a pump 11 via a down duct 15 having connected in series therein a first electrically controlled valve 2 and a first check valve 3, and to the outlet of the pump 11 via an up duct 16 having connected in series therein a second electrically controlled valve 6 and a second check valve 5. A third electrically controlled valve 6a is connected in a first parallel duct 15a between a pressure accumulator 4 and the down duct 15, said first parallel duct 15a connecting to the down duct 15 between the check valve 3 and the pump 11. A fourth electrically controlled valve 2a is connected to in a second parallel duct 16a provided between the accumulator 4 and the up duct 16, said second parallel duct 16a joining the up duct 16 between the electrically controlled valve 6 and the pump 11. A pressure release valve 17 connected to an oil tank 14 is provided at the outlet of the pump 11 on the up duct 16. The pump inlet is also connected to the oil tank 14 via an admission duct 18 fitted with a check valve 19. A fifth electrically controlled valve 8 is connected on a third parallel duct 20 which connects the accumulator 4 to the up duct 16 at a point situated between the pressure release valve 17 and the electrically controlled valve 6. A pressure indicator 7 indicates the pressure in the pressure accumulator 4. Finally, the closure valve 9 is connected to the oil tank 14 via an emergency duct 21 fitted with a manual pump 13. The pump 11 is rotated by a motor 12 that is electrically regulated.

Figure 3:
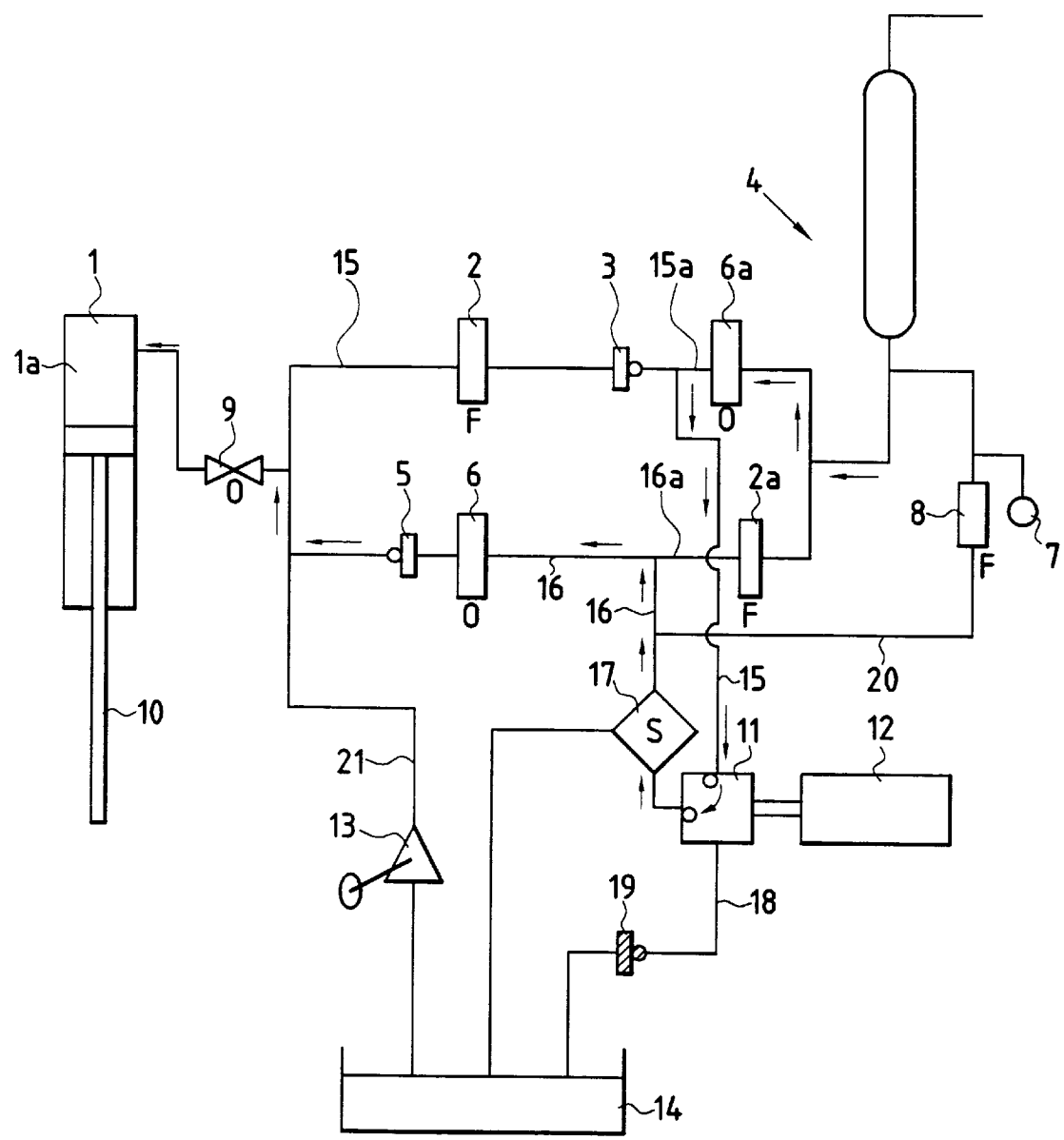
FIG. 3 shows the oil circuit while the elevator is moving upwards.

While the elevator is moving upwards, the electrically controlled valves 2, 2a, and 8 are closed. The electrically controlled valves 6 and 6a and the closure valve 9 are open. Oil flow from the pressure accumulator 4 to the pressure chamber in the cylinder of the actuator 1 is represented by arrows in FIG. 3.

Figure 4:
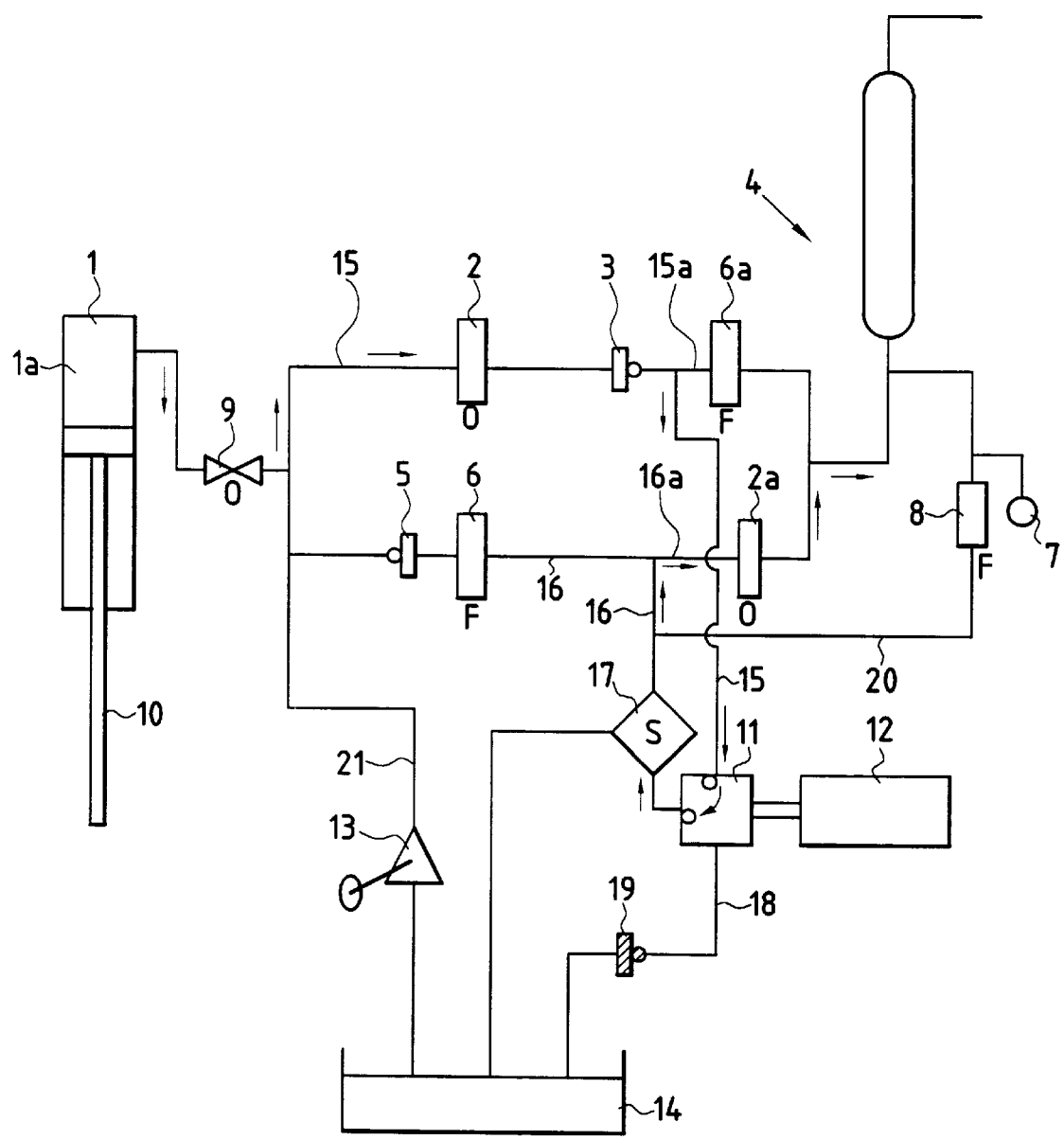
FIG. 4 shows the oil circuit while the elevator is moving downwards.
Figure 5:
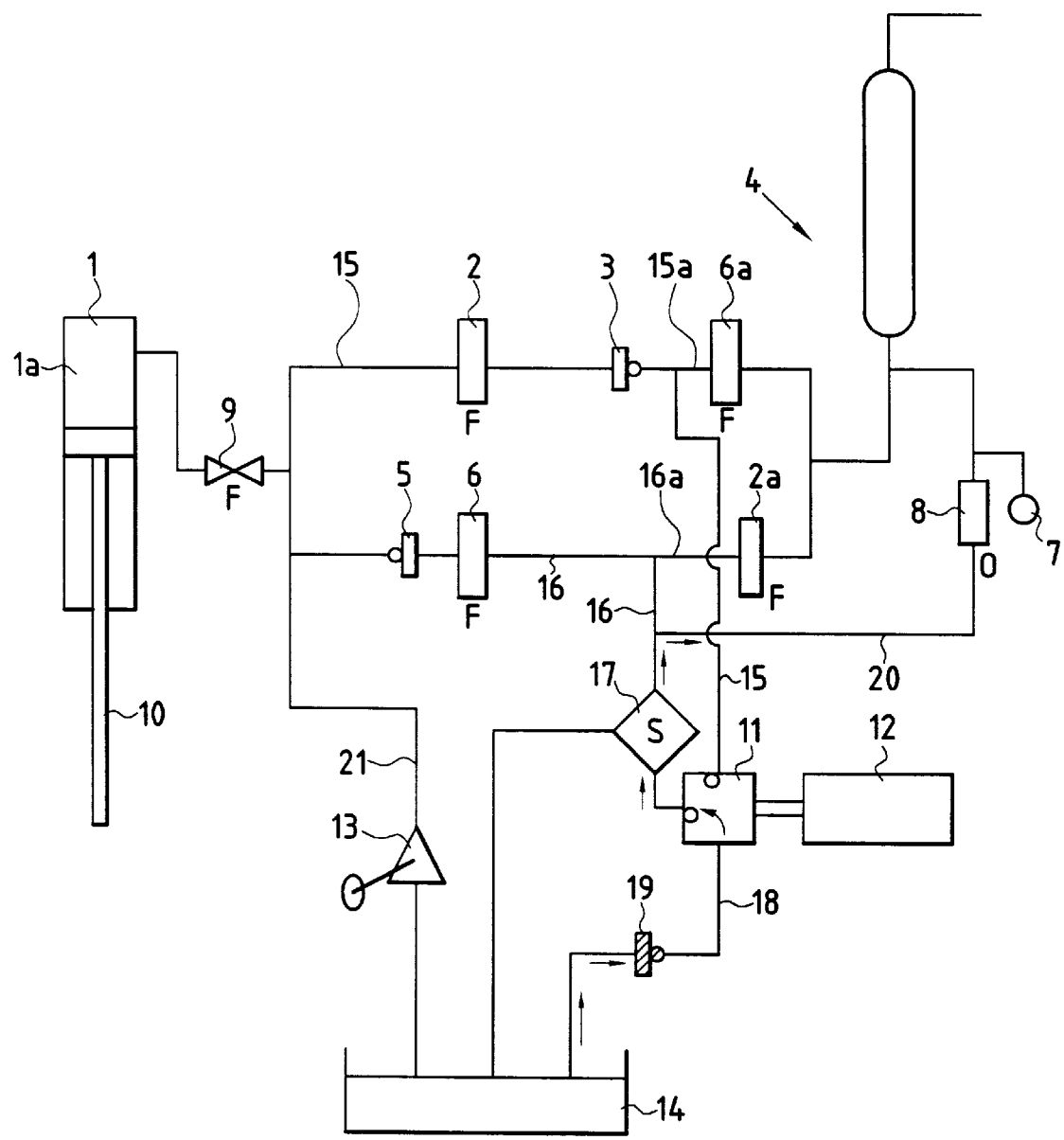
FIG. 5 shows the oil circuit while the accumulator is being recharged.

When the elevator is moving downwards, the electrically controlled valves 6, 6a, and 8 are closed. The electrically controlled valves 2 and 2a and the closure valve 9 are open. The flow of oil between the pressure chamber of the cylinder of the actuator 1 and the pressure accumulator 4 is represented by arrows in FIG. 4.

When the elevator is stationary, all of the electrically controlled valves 2, 2a, 6, 6a, and 8, are closed, as is the closure valve 9.

When it is desired to recharge the pressure accumulator 4 with oil, the electrically controlled valves 2, 2a, 6, and 6a are closed while the electrically controlled valve 8 is open. The pump 11, driven by the motor 12, takes oil from the tank 14 via the admission duct 18 and delivers it into the accumulator 4 via the third parallel duct 20;

When the elevator is in its low position, the piston 10 is retracted into the cylinder of the actuator 1, and the volume of the pressure chamber 1a of the actuator 1 is at a minimum. In this condition, the oil for moving the actuator cylinder is stored under high pressure in the pressure accumulator 4. Conversely, when the elevator is in its high position, the piston rod 10 is deployed outside the actuator cylinder 1, and the volume of the pressure chamber 1a of the actuator 1 is at a maximum. In this condition, there is little oil in the pressure accumulator 4 and the pressure inside the pressure accumulator is at a minimum value.

When the elevator begins to move up, the oil pressure in the pressure accumulator 4 delivers the force required for causing the elevator to move up. When the pressure in the pressure accumulator 4 is too small to compensate for the load of the elevator, due to oil being transferred to the pressure chamber 1a of the actuator, the motor 12 delivers additional energy to the pump 11.

Conversely, when the elevator begins to move down, the load thereof serves to transfer fluid from the pressure chamber 1a of the actuator 1 to the pressure accumulator 4 without assistance from the motor 12. When the pressure in the pressure accumulator 4 reaches a mean value, then the motor 12 drives the pump 11 and pumps oil from the chamber 1a of the actuator so as to insert it under pressure into the pressure accumulator 4.

The energy consumed by the motor 12 serves solely to compensate for the maximum pressure differences that exist between the pressure chamber 1a of the actuator 1 and the pressure accumulator 4 when the elevator is in its high and low positions.

When shown to be necessary by the pressure indicator 7, the electrically controlled valve 8 opens to enable the accumulator 4 to be recharged by the pump 11.

The piston 10 represented by a rod in the cylinder of the actuator 1 moves outwards under drive from the oil pressure delivered via the closure valve 9 when the electrically controlled valves 6 and 6a are open. The piston returns into the cylinder of the actuator when the free end of the rod under drive from the load due to gravity itself delivers pressure to the piston on the electrically controlled valves 2 and 2a being opened. The pump 11 is driven in the same direction of rotation as required both for downward and upward travel by the motor 12 which is electrically regulated.

It will thus be understood that by controlling travel of the cage in the up direction by means of the electrically controlled valves 6 and 6a, the pump 11 and the motor 12 need hardly deliver any force, because of the presence of the pressure accumulator 4 in the circuit which on its own suffices instantaneously to deliver the requirements for moving the apparatus. This means that the elevator is perceived to start immediately, without any waiting.

The upward travel cycle of the cage inverts inexorably. The downward travel of the cage under the effect of gravity generates pressure at the base of the actuator, and the invention with which we are concerned lies in making good use of this energy so that it can be reused.

For most of the time that the elevator is moving down, the pump 11 delivers no force and might even have a tendency to act as a generator, and this energy is channeled to the pressure accumulator 4. The pump 11 satisfies needs associated with the speed of the apparatus, thus ensuring that the quantity of oil required by the actuator is delivered at the proper rate.

The electrically controlled valve 8 enables the accumulator to be recharged should that be necessary, and depending on the pressure indicated by the pressure meter 7. This action is necessary on initial commissioning, and in the event of the cabin being worked on or stationed at the bottom of the shaft, or in order to counter any leakage. In ordinary operation, the charge in the accumulator 4 is provided by the action of the piston 10.

The hand pump 13 is installed between the tank 14 and the closure valve 9, but its presence is purely symbolic. It is provided to enable the actuator to be displaced, should that be necessary, before the accumulator 4 is installed.

In the event of a mains failure, the elevator can move up to release its passengers without energy being delivered thereto, and likewise it can move down. To make this possible, all that is required is a low voltage power supply at 12 V or 24 V applied to the electrically controlled valves 2, 2a to move down, or to the electrically controlled valves 6, 6a to move up. When the electrically controlled valves 6 and 6a are open, they enable the pressure accumulator 4 to release energy it has stored, thereby moving the piston 10 in the up direction, even in the event of a mains failure. The piston 10 can be moved in the down direction, even in the event of a main failures, by opening the electrically controlled valves 2 and 2a, thereby enabling the cage to be lowered and recharging the pressure accumulator 4, with any surplus oil being delivered to the tank 14.

The electrical installation which is conventionally rated at 15 kW to 40 kW, can be reduced to 5 kW. It can quickly be shown that the savings in energy consumption over two to three years suffice to pay back the supply and installation of the elevator.

The emergency manual pump 13 could be replaced by a valve with a pushbutton enabling oil to be released at a slow rate from the pressure accumulator 4 or the pressure chamber 1a directly into the tank 14.

The electrically controlled valve 8 can advantageously be omitted, with the electrically controlled valve 2a then being in an open position whenever the pressure accumulator 4 is being recharged. Under such circumstances, the third parallel duct can be omitted.

What is claimed is:

1. A drive device for a hydraulic type elevator, the device comprising an actuator cylinder (1) in which a piston (10) is slidably mounted and having a pressure chamber (1a) connected via a hydraulic circuit to a pump (11) driven by a motor (12) and connected to a source of fluid, the device being characterized by the fact that the source of fluid is constituted by a pressure accumulator (4) and by the fact that the hydraulic circuit comprises:

a down duct (15) connecting the pressure chamber (1a) to the inlet of the pump (11) and in which there are connected in series a first electrically controlled valve (2) and a first check valve (3);

an up duct (16) connecting the outlet of the pump (11) to the pressure chamber (1a), and in which there are connected in series a second electrically controlled valve (6) and a second check valve (5);

a first parallel duct (15a) connecting the pressure accumulator (4) to the down duct (15) at a point situated between the first check valve (3) and the inlet to the pump (11), and in which a third electrically controlled valve (6a) is connected; and a second parallel duct (16a) connecting the pressure accumulator (4) to the up duct (16) at a point situated between the second electrically controlled valve (6) and the outlet from the pump (11), and in which a fourth electrically controlled valve (2a) is connected;

by the fact that the first electrically controlled valve (2) and the third electrically controlled valve (2a) are open while the elevator is moving downwards, the second electrically controlled valve (6) and the fourth electrically controlled valve (6a) then being closed; and by the fact that the second electrically controlled valve (6) and the fourth electrically controlled valve (6a) are open while the elevator is moving upwards, the first electrically controlled valve (2) and the third electrically controlled valve (2a) then being closed.

2. A device according to claim 1, characterized by the fact that a closure valve (9) is provided between the pressure chamber (1a) and the up and down ducts (15, 16), which closure valve is open during both upward and downward movement of the elevator.

3. A device according to claim 2, characterized by the fact that it further comprises a tank (14) connected to the closure valve (9) via an emergency duct (21) fitted with an emergency manual pump (13).

4. A device according to claim 1, characterized by the fact that the inlet of the pump (11) is connected to a tank (14) via an admission duct fitted with a non-return valve (19).

5. A device according to claim 4, characterized by the fact that only the fourth electrically controlled valve (2a) is open while the pressure accumulator (4) is being recharged by the pump (11).

6. A device according to claim 1, characterized by the fact that a pressure release valve (17) is provided at the outlet from the pump (11) on the up duct (16).

7. A device according to claim 1, characterized by the fact that the pressure accumulator (4) is fitted with a pressure indicator (7).

8. A device according to claim 6, characterized by the fact that a third parallel duct (20) is also provided between the pressure accumulator (4) and the up duct (16) at a point situated between the pressure release valve (17) and the second electrically controlled valve (6).

* * * * *